(12) United States Patent
Cerqueira

(10) Patent No.: US 12,539,960 B2
(45) Date of Patent: Feb. 3, 2026

(54) MULTI-ENGINE AIRCRAFT PROVIDED WITH ECONOMY OPERATING MODE AND METHOD APPLIED

(71) Applicant: AIRBUS HELICOPTERS, Marignane (FR)

(72) Inventor: Stephane Cerqueira, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 507 days.

(21) Appl. No.: 17/695,933

(22) Filed: Mar. 16, 2022

(65) Prior Publication Data

US 2022/0306308 A1 Sep. 29, 2022

(30) Foreign Application Priority Data

Mar. 23, 2021 (FR) ........................... 2102873

(51) Int. Cl.
*B64C 27/12* (2006.01)
*B64D 31/04* (2006.01)
*B64D 31/06* (2024.01)

(52) U.S. Cl.
CPC .............. *B64C 27/12* (2013.01); *B64D 31/04* (2013.01); *B64D 31/06* (2013.01)

(58) Field of Classification Search
CPC ........ B64D 31/06; B64D 31/04; B64D 27/04; B64D 35/04; B64D 35/08; B64D 31/12; B64D 45/00; B64C 27/57; B64C 27/12; F05D 2220/329; F02C 9/42
See application file for complete search history.

(56) References Cited

U.S. PATENT DOCUMENTS

| 10,481,615 | B2 | 11/2019 | Kim |
| 2011/0168835 | A1 | 7/2011 | Oliver |
| 2013/0219905 | A1* | 8/2013 | Marconi ................. F02C 7/268 |
| | | | 60/39.12 |

(Continued)

FOREIGN PATENT DOCUMENTS

| EP | 3069990 A1 | 9/2016 |
| EP | 3095695 A1 | 11/2016 |

(Continued)

OTHER PUBLICATIONS

Korean Office Action dated Jul. 16, 2023, Application No. 10-2022-0034668, Applicant Airbus Helicopters, 8 pages.

(Continued)

*Primary Examiner* — Scott A Browne
*Assistant Examiner* — Shahira Baajour
(74) *Attorney, Agent, or Firm* — BROOKS KUSHMAN P.C.

(57) ABSTRACT

A method for controlling an aircraft with a rotary wing provided with a power plant comprising a plurality of engines, the aircraft comprising a human-machine interface controlling a control member capable of acting on a longitudinal acceleration of the aircraft. During the economy operating mode during which one of the engines does not supply power, the method comprises measuring a forward speed of the aircraft, and adjusting an authority of the human-machine interface over the longitudinal acceleration with a flight control computer as a function of the forward speed.

20 Claims, 2 Drawing Sheets

(56) References Cited

U.S. PATENT DOCUMENTS

| | | | |
|---|---|---|---|
| 2014/0145028 A1* | 5/2014 | Gomez | B64D 31/06 244/58 |
| 2014/0229036 A1* | 8/2014 | Vallart | B64D 31/00 701/3 |
| 2015/0375850 A1* | 12/2015 | Salesse-Lavergne | B64C 27/57 244/17.13 |
| 2016/0144971 A1* | 5/2016 | Vallart | B64D 31/06 701/3 |
| 2016/0375994 A1 | 12/2016 | Rossotto | |
| 2017/0144747 A1 | 5/2017 | Bihel et al. | |
| 2017/0247114 A1 | 8/2017 | Moulon et al. | |
| 2018/0251207 A1 | 9/2018 | Kim | |
| 2019/0248482 A1* | 8/2019 | Gillett | B64C 27/57 |
| 2020/0309038 A1 | 10/2020 | Ng et al. | |
| 2020/0361620 A1* | 11/2020 | Beauchesne-Martel | B64C 27/57 |

FOREIGN PATENT DOCUMENTS

| | | | | |
|---|---|---|---|---|
| EP | 3170744 A1 | 5/2017 | | |
| EP | 3209563 B1 | 8/2018 | | |
| FR | 2967132 B1 | 11/2012 | | |
| FR | 2967133 B1 | 11/2012 | | |
| WO | WO 84/01345 | * | 4/1984 | B64C 19/00 |

OTHER PUBLICATIONS

French Search Report for French Application No. FR2102873 Completed by the French Patent Office, Dated Dec. 7, 2021, 10 pages.

First Chinese Office Action for Chinese Patent Publication No. 202210273178.8, dated Apr. 4, 2025, 18 pages (including English translation).

Second Chinese Office Action for Chinese Patent Publication No. 202210273178.8, dated Jul. 12, 2025, 9 pages (including English translation).

* cited by examiner

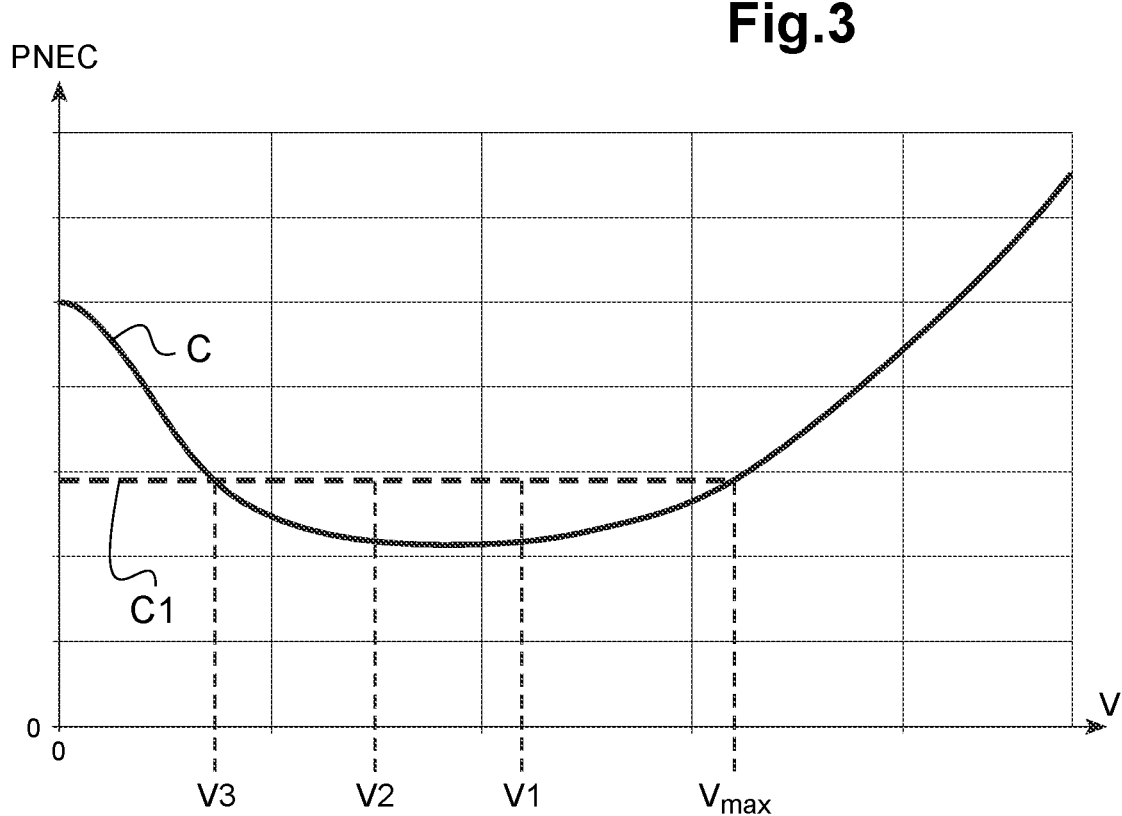

MULTI-ENGINE AIRCRAFT PROVIDED WITH ECONOMY OPERATING MODE AND METHOD APPLIED

CROSS REFERENCE TO RELATED APPLICATIONS

This application claims priority to French patent application No. FR 21 02873 filed on Mar. 23, 2021, the disclosure of which is incorporated in its entirety by reference herein.

TECHNICAL FIELD

The present disclosure relates to a multi-engine aircraft provided with an economy operating mode, and to the method applied.

BACKGROUND

For example, the aircraft may include various rotary members set in motion by a power plant. Thus, an aircraft has a rotary wing and possibly a yaw motion control rotor.

On a twin engine helicopter, the necessary power to be supplied by the power plant varies depending on the forward speed. The necessary power decreases progressively from a zero forward speed to an intermediate speed and then increases progressively as the forward speed increases. In a range of speeds ranging from a first lower speed limit to a second upper speed limit, all the necessary power required to drive the rotary members can be supplied by a single engine.

During an economy operating mode, one of the engines can therefore be put on standby, i.e., switched off or put into an idling operating state, when the aircraft is operating in this speed range in order to optimize fuel consumption. However, when the speed of the aircraft decreases and approaches the first speed, the engine on standby must be reactivated before the first speed is reached. Due to the ability of the aircraft to decelerate rapidly and the time required to reactivate an engine, the engine on standby may need to be reactivated at a speed much higher than the first speed in order to be able to supply mechanical power. This limits the advantage of the economy operating mode.

Patent EP 3 209 563 B1 discloses an economy operating mode during which an engine of a multi-engine power plant produces much less power than a nominal power, or is even switched off in flight. An electrotechnical system powered by the on-board network or by a specific electrical energy supply network is then used to quickly reactivate this engine.

Such a system is advantageous but requires a dedicated electrotechnical system, and can therefore have a not-insignificant impact in terms of weight.

Patent FR 2 967 132 B1 describes a method for optimizing the specific fuel consumption of a helicopter having two turboshaft engines. According to the method, the two turboshaft engines supply substantially different amounts of power. One of the turboshaft engines can operate in continuous operating mode while the other turboshaft engine is placed on standby at zero power and the combustion chamber is extinguished, while rotation is maintained by an active drive mechanism with a view to a reliable restart. If a conventional restart fails, the restart may be carried out by emergency assistance through additional firing of the combustion chamber. This additional firing may be achieved with a glow plug, laser radiation or pyrotechnic device.

Patent FR 2 967 133 B1 describes a method for optimizing the specific fuel consumption of a helicopter having two turboshaft engines. According to the method, one of the turboshaft engines can operate in continuous operating mode while the other turboshaft engine operates in a super slow mode at zero power. If a conventional restart fails, the turboshaft engine operating in super slow mode may be restarted by emergency assistance produced by a self-contained energy source dedicated to this restart.

Documents EP 3 170 744 A1, EP 3 069 990 and EP 3 095 695 are also known.

SUMMARY

An object of the present disclosure is therefore to propose an alternative multi-engine aircraft intended to optimize fuel consumption during flight.

The disclosure therefore relates to a method for controlling a rotary-wing aircraft provided with a power plant comprising a plurality of engines setting said rotary wing in motion, said aircraft comprising a human-machine interface controlling a control channel leading to a control member capable of acting on a longitudinal acceleration of the aircraft, said aircraft comprising a flight control computer, the aircraft being capable of operating in an economy operating mode during which at least one of said plurality of engines does not supply mechanical power to said rotary wing and at least one of said plurality of engines supplies mechanical power to said rotary wing.

During the economy operating mode, the method comprises the following steps:
  measuring a forward speed of the aircraft; and
  adjusting an authority of said human-machine interface over said longitudinal acceleration with the flight control computer as a function of the forward speed.

The economy operating mode may be triggered by a pilot or a co-pilot operating a dedicated interface, or indeed automatically.

Each engine therefore comprises a combustion chamber and a working shaft capable of transmitting power to the rotary wing. During the economy operating mode, at least one engine is on standby, i.e., it does not produce mechanical power setting the rotary wing in motion. An engine on standby may be switched off or idling. The term "idling" refers to a state during which a movable member of the engine, separate from the working shaft, is set in motion, whether the combustion chamber is lit or not.

The engine on standby may therefore have a combustion chamber that is kept lit in order to set a movable member of the engine in motion without supplying power. For example, a shaft of a gas generator of a free turbine turboshaft engine rotates at approximately 20 to 80 percent of its nominal speed, the free turbine not being set in motion by the turboshaft engine.

According to another example, the combustion chamber of the engine on standby may be extinguished, the movable members of the engine being stationary or a movable member being set in motion by another drive member, such as an electric machine. On a turboshaft engine, a shaft of a gas generator may be set in motion by an electric machine at a speed of approximately 5 to 20 percent of its nominal speed in order to help facilitate a restart.

Therefore, if the engine is a free turbine turboshaft engine, the free turbine may not be set in motion by the turboshaft engine during a standby mode. The gas generator may also be stationary or in motion, under the effect of the combustion of a small quantity of fuel and/or driven via an auxiliary engine.

During the economy operating mode, the flight control computer adjusts the authority of the human-machine interface as a function of the forward speed. The authority represents the extreme order that can be given by the human-machine interface. With a human-machine interface comprising a movable member, the same movement of this movable member results in different longitudinal accelerations in the presence of two forward speeds of 100 knots and 150 knots, for example. It should be noted that a knot is equal to 1.852 kilometers per hour/1.1508 miles per hour. By convention, a negative longitudinal acceleration may be a longitudinal deceleration.

For the record, the economy operating mode may be implemented in a range of forward speeds ranging from a minimum speed threshold to a maximum speed threshold.

When the forward speed is much higher than the lower limit of this speed range, the authority of the human-machine interface can be maximized. When the human-machine interface comprises a lever, for example, the greatest possible movement of the lever produces a maximized longitudinal deceleration that tends to swiftly decrease the forward speed of the aircraft. Indeed, in this situation, the engine on standby can, if necessary, be reactivated before the lower limit is reached. By way of illustration, a period of 30 seconds may be necessary in order to reactivate an engine.

Such a reactivation may consist in increasing the flow rate of fuel supplied to the engine in question in order to produce a stored and non-zero mechanical power with the engine. Reactivation may be achieved by applying the method for starting the engine. Reactivation then consists of a conventional starting procedure, at least one movable member of the reactivated engine not necessarily being stationary when the method for starting the engine is initiated.

However, when the forward speed is closer to the lower limit, the flight control computer reduces the authority of the human-machine interface in order to ensure that the engine on standby can be reactivated before the lower limit is reached, regardless of the operation of the human-machine interface.

For example, the optimum deceleration capacity of the aircraft may make it possible, at such a forward speed, to reach the lower limit in 15 seconds, whereas the time required to reactivate the engine is 30 seconds. Therefore, the flight control computer reduces the authority of the human-machine interface in order to restrain the aircraft and reduce its ability to decelerate. Due to the reduction in the authority of the human-machine interface, the aircraft can reach the lower limit after a period greater than or equal to 30 seconds.

According to the above example, the greatest possible movement of the lever produces less deceleration than previously. The forward speed decreases less rapidly, which helps ensure that the engine on standby can be reactivated if necessary before the lower limit is reached and before an emergency operating state is applied.

This method may therefore tend to increase the time during which an engine is on standby in order to optimize fuel consumption. The method can thus prevent the need to trigger unnecessary emergency reactivations.

The flight envelope allowing the use of the economy mode can also be optimized.

The method may further comprise one or more of the following features, taken individually or in combination.

According to one possibility, the flight control computer may emit a control signal transmitted to at least one variable-geometry member of the control channel.

Such a variable-geometry member may be a linear or rotary actuator, a variable-length bellcrank, or the like.

The method may then include the following step during the economy operating mode:

when said forward speed lies between a minimum speed threshold and a maximum speed threshold, adjusting an authority of said human-machine interface over said longitudinal acceleration includes generating said control signal with the flight control computer as a function at least of said forward speed, or indeed a command signal emitted by the human-machine interface.

The flight control computer is configured to also take into account the forward speed in order to reduce the authority of the human-machine interface, if necessary.

At least one of the maximum and minimum speed thresholds is fixed or variable as a function of at least one positioning parameter.

The maximum speed threshold and/or the minimum speed threshold may be fixed following tests or calculations, for example.

Alternatively, the maximum speed threshold and/or the minimum speed threshold may be variable in order to take into account various parameters likely to influence the operation of the engines and the power necessary in order to adhere to the flight scenario of the aircraft.

Optionally, since the economy operating mode may be implemented in a range of forward speeds ranging from a minimum speed threshold to a maximum speed threshold, the method comprises the following steps during the economy operating mode:

when said forward speed lies between an intermediate speed threshold and the maximum speed threshold, the maximum speed threshold being greater than the intermediate speed threshold, adjusting an authority of said human-machine interface over said longitudinal acceleration comprises generating said control signal with the flight control computer as a function of a first law; and when said forward speed lies between the minimum speed threshold and the intermediate speed threshold, the minimum speed threshold being less than the intermediate speed threshold, adjusting an authority of said human-machine interface over said longitudinal acceleration comprises generating said control signal with the flight control computer as a function of a second law, said first law conferring a greater said authority on the human-machine interface than the second law.

Each law may be in the form of at least one equation, a table of values, etc.

The flight control computer applies a first stored law when the forward speed is greater than the minimum speed threshold, or than an intermediate speed threshold greater than the minimum speed threshold. However, when the forward speed approaches the minimum speed threshold, the flight control computer applies a second law limiting the authority of the human-machine interface.

The method optionally comprises a transitional phase between a phase of use of the first law and a phase of use of the second law.

This possibility may help prevent the pilot from experiencing the change in law.

According to one possibility compatible with the preceding possibilities, the intermediate speed threshold may be fixed or variable as a function of at least one positioning parameter.

Furthermore, the positioning parameter that is likely to influence one of the abovementioned thresholds may be a current density altitude of the aircraft.

According to one possibility compatible with the preceding possibilities, during the economy operating mode, when said forward speed drops below a reactivation speed threshold, the method may include reactivating said engine that is not supplying mechanical power to the rotary wing in order to transmit mechanical power with this engine.

The reactivation speed threshold is greater than the minimum speed threshold. The reactivation speed threshold is lower than the maximum speed threshold and the intermediate speed threshold. The reactivation speed threshold may be fixed or variable depending on at least one operating parameter.

According to one possibility compatible with the preceding possibilities, the method may include limiting said maximum forward speed to a maximum speed threshold, by means of the flight control computer.

During the economy operating mode, the flight control computer may act on the aircraft in order not to exceed a maximum speed resulting in the reactivation of the engine that is initially in standby.

The economy operating mode can then be deactivated in order to reactivate this engine and achieve greater aircraft forward speeds.

According to one possibility compatible with the preceding possibilities, the method may include automatically deactivating said economy operating mode on command of the flight control computer when said forward speed is less than a minimum speed threshold.

In addition to a method, the disclosure relates to an aircraft applying this method.

Such an aircraft is provided with a rotary wing and a power plant comprising a plurality of engines setting said rotary wing in motion, said aircraft comprising a human-machine interface controlling a control channel leading to a control member capable of acting on a longitudinal acceleration of the aircraft, said aircraft comprising a flight control computer, the aircraft being capable of operating in an economy operating mode during which at least one of said plurality of engines does not supply mechanical power to the rotary wing and at least one of said plurality of engines supplies mechanical power to the rotary wing.

The aircraft further includes a forward speed sensor, said flight control computer being configured to apply the method according to the disclosure.

The aircraft may comprise a variable-geometry member acting on a position of the control member, the flight control computer communicating with this variable-geometry member.

BRIEF DESCRIPTION OF THE DRAWINGS

The disclosure and its advantages appear in greater detail in the context of the following description of embodiments given by way of illustration and with reference to the accompanying figures, in which:

FIG. 3 is a diagram explaining the method of the disclosure.

DETAILED DESCRIPTION

Elements that are present in more than one of the figures are given the same references in each of them.

Figure 1:
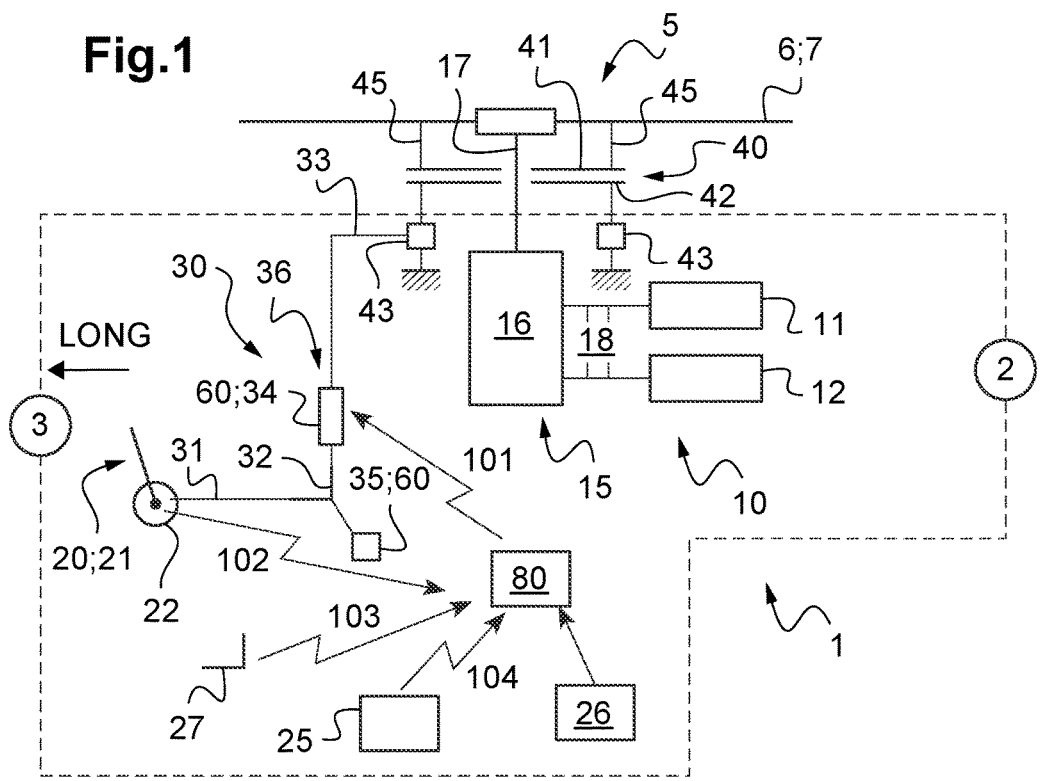
FIG. 1 is an embodiment of an aircraft according to the disclosure.
Figure 2:
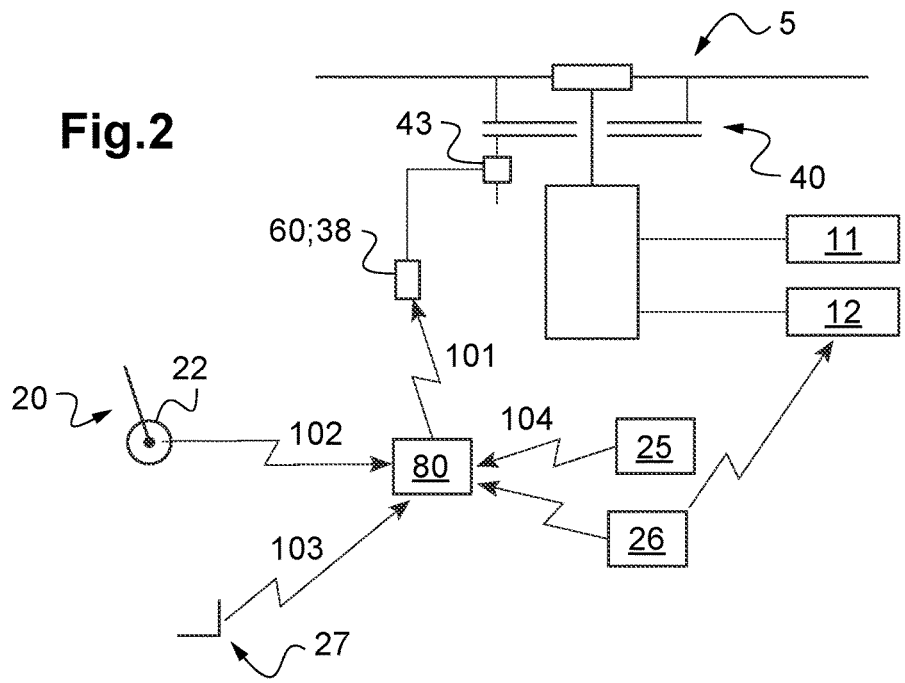
FIG. 2 is an embodiment of an aircraft according to the disclosure.

FIGS. 1 and 2 show embodiments of an aircraft suitable for implementing the method of the disclosure.

Irrespective of the embodiment, and with reference to FIG. 1, for example, the aircraft 1 according to the disclosure may comprise an airframe shown schematically with dotted lines. The airframe extends along a longitudinal axis, and from the rear towards the front, from a tail 2 towards a nose 3. The term "longitudinal" refers to a direction leading from the tail 2 towards the nose 3, in a direction substantially parallel to the roll axis. The expression "longitudinal acceleration" is commonly used by a person skilled in the art.

This aircraft 1 comprises a rotary wing 5 provided with blades 6. Optionally, the aircraft 1 may comprise at least one other rotor, which is not shown here, such as, for example, a side rotor, a rear rotor, another rotary wing, etc.

In order to set in motion, in particular, the rotary wing 5 or indeed the rotor or rotors, the aircraft 1 comprises a power plant 10. This power plant comprises several engines 11, each capable of setting the rotary wing 5 in motion. The engines 11, 12 may be controlled by at least one engine computer, which is not shown here. For example, the engines 11, are all mechanically connected to the rotary wing 5 by a power transmission system 15. Such a power transmission system 15 may comprise a rotor mast 17 secured to the rotary wing 5, a gearbox 16 provided with the rotor mast 17, at least one shaft, and/or at least one coupling means, etc. According to the example shown, each engine 11, 12 comprises a power shaft driving a gearbox 16 via connections 18, the gearbox comprising a rotor mast 17. On an aircraft provided with at least one other rotor, the gearbox 16 or another may be connected to each rotor by dedicated transmissions.

In order to control the movements of the aircraft 1, this aircraft 1 comprises a human-machine interface 20. Such a human-machine interface may include a lever, a stick 21, a mini-stick, a knob, a touch panel, etc. Optionally, the human-machine interface 20 includes a sensor 22 transmitting at least one command signal 102 depending on the actuation of this human-machine interface 20.

For example, the human-machine interface 20 comprises a stick 21 that can rotate about two axes. The sensor may include one position sensing device per axis, such as a potentiometer, for example.

The term "signal" refers to an analog, digital, electrical or optical signal.

This human-machine interface 20 cooperates with a control channel 30 leading to a control member 7 capable of acting on the longitudinal acceleration of the aircraft 1. Such a control member 7 may, for example, be in the form of a blade 6 of the rotary wing 5 and/or a blade of another rotor and, for example, a propeller, or indeed a flap if any.

FIG. 1 shows an example of conventional assisted mechanical flight control, and FIG. 2 shows an example of electrical flight control.

According to FIG. 1, the human-machine interface 20 is mechanically connected to a mechanical control channel 30. This mechanical control channel 30 may include a mechanical connection 36 leading to one or more servo-controls 43. This mechanical connection 36 may have at least one shaft 31, and/or at least one bellcrank 32, and/or at least one series actuator 34, and/or at least one parallel actuator 35, usually referred to as a "trim actuator". Each servo-control 43 is connected to a stationary swashplate 42 of a set 40 of swashplates. This set 40 of swashplates further comprises a rotating swashplate 41 connected via rods 45 to respective blades 6 of the rotary wing 5.

By controlling the cyclic pitch of the blades 6 of the rotary wing 5, the human-machine interface 20 makes it possible to control the longitudinal acceleration of the aircraft 1 in a conventional manner.

According to a possibility not shown here, the human-machine interface can collectively control the pitch of the blades of the rotary wing and/or of at least one of the other rotors for this purpose.

According to FIG. 2, the servo-control or servo-controls are controlled by at least one control actuator 38 controlled by a flight control computer 80. The flight control computer 80 stores at least one law providing a setpoint to be transmitted to the control actuator 38 as a function of a command signal 102 emitted by the human-machine interface 20.

FIGS. 1 and 2 show examples of architectures indicating how a human-machine interface 20 can control the longitudinal acceleration of the aircraft 1 by controlling control members. Other architectures may be considered without necessary, departing from the context of the claimed disclosure.

Regardless of the architecture, and with reference to FIG. 2, for example, the aircraft 1 includes a flight control computer 80.

The term "computer" may comprise, for example, one or more units, each having at least one processor and at least one memory, at least one integrated circuit, at least one programmable system, and at least one logic circuit, these examples not limiting the scope to be given to the term "computer". The term "processor" may refer equally to a central processing unit (CPU), a graphics processing unit (GPU), a digital signal processor (DSP), a microcontroller, etc. Several described computers may be combined to form a single computer.

The flight control computer 80 may be a computer of a system referred to by the acronym AFCS, standing for automatic flight control system.

If appropriate, the flight control computer 80 may be connected, via a wired or wireless link, to the human-machine interface 20 in order to receive the command signal 102.

The flight control computer 80 may be connected, via a wired or wireless link, to a forward speed sensor 27 measuring a forward speed V of the aircraft 1. For example, the forward speed may be the true airspeed, the air speed or the like. Such a forward speed sensor 27 may comprise a Pitot tube system, a satellite positioning system, etc. The forward speed sensor 27 transmits a speed signal 103 carrying the forward speed V to the flight control computer 80.

The flight control computer 80 may be connected, via a wired or wireless link, to at least one positioning sensor 25. Each positioning sensor 25 emits a positioning signal transmitted to the flight control computer 80. For example, a positioning sensor 25 measures a density altitude, this sensor 25 comprising, for example, a temperature sensor and a pressure sensor. The positioning sensor 25 transmits a positioning signal 104 carrying the value of the positioning parameter to the flight control computer 80.

The aircraft 1 can operate in an economy operating mode. During such an economy operating mode and at least within a speed range, at least one engine 11 or 12 is in operation, producing mechanical power in order to set the rotary wing 5 in motion. In addition, at least one engine 11 or 12 is on standby. An engine on standby does not supply any mechanical power to set the rotary wing 5 in motion. The engine on standby is either stopped or idling. For example, the engines 11 and 12 are free turbine turboshaft engines.

The free turbine of a turboshaft engine on standby is stationary or only set in motion under the effect of the flow of air that passes through the engine as a result of the forward travel of the aircraft. In this case, it is not the engine as such that sets the free turbine in motion. The expression "economy operating mode during which at least one of said plurality of engines does not supply mechanical power to said rotary wing" means that the engine itself does not rotate its output shaft connected to the rotary wing, this output shaft being capable of being set in motion under the effect of the wind.

A shaft of the gas generator of a turboshaft engine on standby is also stationary or rotates at a reduced speed, driven by an auxiliary drive member or low fuel combustion, or even the wind. The speed range may, for example, range from a reactivation threshold to a maximum speed threshold, which are referred to hereinafter.

For example, the aircraft 1 may include a control 26 that can be operated by a pilot to request implementation of the economy operating mode. The control 26 emits an operating signal transmitted to a computer in order to put at least one engine 11 or 12 on standby. For example, the operating signal is transmitted to an engine computer. The flight control computer 80 may also receive the operating signal.

Therefore, during the economy operating mode, the flight control computer is configured to apply the method of the disclosure. In particular, the flight control computer is configured to control a variable-geometry member 60 acting on a position of the control member 7 as a function of the forward speed V. The flight control computer 80 is therefore configured to transmit a control signal to at least one variable-geometry member 60. Such a variable-geometry member 60 may be a variable-geometry bellcrank 32, a series actuator 34, a parallel actuator 35, or a control actuator 38. The term "variable-geometry member" refers to any member capable of being geometrically modified to limit the authority of the human-machine interface 20.

FIG. 3 is a diagram showing the method of the disclosure. This diagram shows the forward speed V on the X-axis and power on the Y-axis.

The curve C shows a necessary power PNEC to be supplied in order to set in motion the various members required at each instant. Starting from a zero forward speed, the necessary power PNEC decreases with an increase in forward speed V, until a minimum zone is reached, and then increases. The power plant and, in particular, the engines 11, 12 are dimensioned so as to be able to supply the necessary power PNEC required at each instant.

A horizontal line C1 shows the power that can be supplied by a single one of the engines. For example, this power is equal to or less than the maximum continuous power that the engine can supply, for example of the order of a predetermined percentage of the maximum continuous power. Such a maximum continuous power is referred to by the acronym MCP. This power level shown by the horizontal line C1 is a compromise between the impact of the power produced by the engine on its damage and the consumption gain obtained.

Consequently, when the necessary power is situated on this line C1 or below this line C1, at least one engine can be put on standby.

During the economy operating mode, the method includes measuring a forward speed V of the aircraft 1. The forward speed sensor 27 transmits a speed signal 103 to the flight control computer 80.

The flight control computer 80 is therefore configured to adjust the authority of the human-machine interface 20 over the longitudinal acceleration as a function of the forward speed V.

For example, the flight control computer 80 may emit a control signal 101, transmitted to at least one variable-geometry member 60, to reduce this authority.

Optionally, the control signal 101 may also depend on the command signal 102 emitted by said human-machine interface 20, at least within the context of an architecture with electrical flight control.

In particular, when the forward speed V lies between a minimum speed threshold V3 and a maximum speed threshold Vmax, the authority of the human-machine interface 20 is adjusted by generating the control signal 101 as a function of the forward speed V. The flight control computer is then configured to compare the forward speed V to the various thresholds mentioned.

For example, the minimum speed threshold V3 is in the region of 80 knots, the maximum speed threshold Vmax being in the region of 160 knots. The minimum speed threshold V3 and the maximum speed threshold Vmax are positioned at the intersections of the curve C showing the necessary power PNEC and the line C1.

In the range of forward speeds ranging from the minimum speed threshold V3 to the maximum speed threshold Vmax, an engine may be on standby or in a reactivation phase.

At least one of the maximum speed threshold Vmax and the minimum speed threshold V3 may be fixed.

At least one of the maximum speed threshold Vmax and the minimum speed threshold V3 may be variable as a function of at least one positioning parameter. The flight control computer 80 is then configured to determine the threshold in question as a function of the value of the positioning parameter. For example, the flight control computer stores a table or an equation giving the value of a threshold as a function of the value of the positioning parameter or parameters. The intermediate speed threshold and the reactivation threshold referred to hereinafter may also be fixed or variable as a function of at least one positioning parameter.

More precisely, when the current forward speed V lies between an intermediate speed threshold V1, for example in the region of 110 knots, and the maximum speed threshold Vmax, the flight control computer 80 can generate the control signal 101 with the flight control computer 80 as a function of a first law.

When the current forward speed V lies between the minimum speed threshold V3 and the intermediate speed threshold V1, the flight control computer 80 can generate the control signal 101 with the flight control computer 80 as a function of a second law.

The first law confers an authority on the human-machine interface 20 greater than the authority obtained with the second law.

Each law may generate the control signal as a function of various parameters, for example as a function of the command signal or indeed other parameters depending on the control mode. According to FIG. 1, a series actuator is usually controlled to stabilize the aircraft and can be controlled in this way. The law used according to the disclosure also tends to limit the authority of the human-machine interface 20. The order given by the human-machine interface 20 may be relayed as is by the first law and may be reduced by the second law. For example, the first law and the second law have a gain. The first law and the second law are identical, except for the gain.

As a basic example, if the human-machine interface 20 is operated to move a shaft one centimeter in translation, the second law may act on an actuator so that this shaft is moved by a distance smaller than this centimeter.

According to another example, the first law may apply the order carried by the command signal. However, the second law may reduce this order, for example by dividing it by a predetermined coefficient.

By way of illustration, the first law and the second law take the following form: $S=G*D$, where "S" represents the command signal, "G" represents a gain and "D" represents a movement of the human-machine interface. G may be equal to 1 with the first law and to 0.5 with the second law.

The flight control computer 80 may also be configured to apply a transitional phase between a phase of use of the first law and a phase of use of the second law. For example, an intermediate law may be applied for a predetermined period of time when switching from the first law to the second law, and vice versa.

Optionally, when the forward speed V drops below a reactivation speed threshold V2, for example in the region of 100 knots, the method may include reactivating the engine on standby in order to produce mechanical power with this engine. Reactivation may be achieved according to a conventional starting procedure. In other words, the flight control computer transmits a signal, for example to an engine computer, which restarts the engine according to the stored method, for example, by modifying the flow rate of fuel.

When the forward speed V drops below the minimum speed threshold V3, the method includes automatically deactivating the economy operating mode on command of the flight control computer 80. The flight control computer 80 may transmit a signal to stop the mode to the engine computers or even to an alerter. The alerter generates an alert to inform the crew. The alerter may include a screen, an acoustic system, a touch-sensitive system, etc.

Conversely, the method may include limiting the forward speed V to a maximum speed threshold, by means of the flight control computer 80.

The flight control computer is configured to control at least one variable-geometry member in order to keep the forward speed within the range allowing an engine to be kept on standby. Such speed limitation may be achieved in a conventional manner.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without departing from the context of the present disclosure.

What is claimed is:

1. A method for controlling an aircraft with a rotary wing provided with a power plant comprising a plurality of engines setting the rotary wing in motion, the aircraft comprising a human-machine interface controlling a control channel leading to a control member capable of acting on a longitudinal acceleration of the aircraft, the aircraft comprising a flight control computer, the aircraft being capable of operating in an economy operating mode during which at least one of the plurality of engines does not supply mechanical power to the rotary wing and at least another one of the plurality of engines supplies mechanical power to the rotary wing, wherein, during the economy operating mode, the method comprises the following steps:

measuring a forward speed of the aircraft; and
generating a control signal with the flight control computer to adjust a gain applied to a command signal from the human-machine interface, such that a longitudinal acceleration authority is reduced as the forward speed decreases within a defined range.

2. The method according to claim 1,
wherein the flight control computer emits a control signal transmitted to at least one variable-geometry member of the control channel, the method comprising the following step during the economy operating mode:
when the forward speed lies between a minimum speed threshold and a maximum speed threshold, adjusting the authority of the human-machine interface over the longitudinal acceleration includes generating the control signal with the flight control computer as a function of the forward speed.

3. The method according to claim 2,
wherein at least one of the maximum speed threshold and the minimum speed threshold is a function of at least one positioning parameter.

4. The method according to claim 3,
wherein the positioning parameter is a current density altitude of the aircraft.

5. The method according to claim 2,
wherein, the economy operating mode being implemented in a range of forward speeds ranging from the minimum speed threshold to the maximum speed threshold, the method comprises the following steps during the economy operating mode:
when the forward speed lies between an intermediate speed threshold and the maximum speed threshold, the maximum speed threshold being greater than the intermediate speed threshold, adjusting the authority of the human-machine interface over the longitudinal acceleration comprises generating the control signal with the flight control computer as a function of a first law; and
when the forward speed lies between the minimum speed threshold and the intermediate speed threshold, the minimum speed threshold being less than the intermediate speed threshold, adjusting the authority of the human-machine interface over the longitudinal acceleration comprises generating the control signal with the flight control computer as a function of a second law, the first law conferring a greater authority on the human-machine interface than the second law.

6. The method according to claim 5,
wherein the method comprises a transitional phase between a phase of use of the first law and a phase of use of the second law.

7. The method according to claim 5,
wherein the intermediate speed threshold is fixed or variable as a function of at least one positioning parameter.

8. The method according to claim 1,
wherein, during the economy operating mode, when the forward speed drops below a reactivation speed threshold, the method includes reactivating the at least one of the plurality of engines that does not supply mechanical power to the rotary wing in order to transmit mechanical power with this engine.

9. The method according to claim 1,
wherein the method includes limiting the forward speed to a maximum speed threshold, by means of the flight control computer.

10. The method according to claim 1,
wherein the method includes automatically deactivating the economy operating mode on command of the flight control computer when the forward speed is less than a minimum speed threshold.

11. An aircraft comprising:
a rotary wing;
a power plant comprising a plurality of engines for setting the rotary wing in motion;
a human-machine interface for controlling a control channel cooperable with a control member capable of acting on a longitudinal acceleration of the aircraft; and
a flight control computer, the aircraft being capable of operating in an economy operating mode during which at least one of the plurality of engines does not supply mechanical power to the rotary wing and at least another one of the plurality of engines supplies mechanical power to the rotary wing; and
a forward speed sensor; the flight control computer being configured to, during the economy operating mode:
measure a forward speed of the aircraft via the forward speed sensor; and
generate a control signal with the flight control computer to adjust a gain applied to a command signal from the human-machine interface, such that a longitudinal acceleration authority is reduced as the forward speed decreases within a defined range.

12. The aircraft according to claim 11,
wherein the aircraft comprises a variable-geometry member acting on a position of the control member, the flight control computer being configured to modify the geometry of the variable-geometry member.

13. A method for controlling an aircraft with a rotary wing provided with a power plant comprising a first engine and a second engine, the first and second engines capable of setting the rotary wing in motion, the aircraft comprising a human to machine interface for controlling a control channel connected to a control member capable of controlling longitudinal acceleration of the aircraft, the aircraft comprising a flight control computer, the aircraft capable of operating in an economy operating mode during which the first engine engine does not supply mechanical power to the rotary wing and the second engine supplies mechanical power to the rotary wing,
wherein, during the economy operating mode, the method comprises the following steps:
measuring a forward speed of the aircraft; and
generating a control signal with the flight control computer to adjust a gain applied to a command signal from the human-machine interface, such that a longitudinal acceleration authority is reduced as the forward speed decreases within a defined range.

14. The method according to claim 13,
wherein the flight control computer emits a control signal transmitted to the control channel, the method comprising the following step during the economy operating mode:
when the forward speed lies between a minimum speed threshold and a maximum speed threshold, adjusting the authority of the human to machine interface over the longitudinal acceleration includes generating the control signal with the flight control computer as a function of the forward speed.

15. The method according to claim 14,
wherein at least one of the maximum speed threshold and the minimum speed threshold is a function of at least one positioning parameter.

16. The method according to claim 14,
wherein, the economy operating mode being implemented in a range of forward speeds ranging from the minimum speed threshold to the maximum speed threshold, the method comprises the following steps during the economy operating mode:
when the forward speed lies between an intermediate speed threshold and the maximum speed threshold, the maximum speed threshold being greater than the intermediate speed threshold, adjusting the authority of the human to machine interface over the longitudinal acceleration comprises generating the control signal with the flight control computer as a function of a first law; and
when the forward speed lies between the minimum speed threshold and the intermediate speed threshold, the minimum speed threshold being less than the intermediate speed threshold, adjusting the authority of the human to machine interface over the longitudinal acceleration comprises generating the control signal with the flight control computer as a function of a second law, the first law conferring a greater authority on the human to machine interface than the second law.

17. The method according to claim 13,
wherein, during the economy operating mode, when the forward speed drops below a reactivation speed threshold, the method includes reactivating the first engine in order to transmit mechanical power with the first engine.

18. The method according to claim 13,
wherein the method includes automatically deactivating the economy operating mode on command of the flight control computer when the forward speed is less than a minimum speed threshold.

19. An aircraft comprising a forward speed sensor, the flight control computer configured to apply the method according to claim 13.

20. The aircraft of claim 19, wherein the forward speed of the aircraft is measured by the forward speed sensor.

* * * * *